United States Patent [19]
Lapras et al.

[11] Patent Number: 5,647,031
[45] Date of Patent: Jul. 8, 1997

[54] DEVICE FOR CHECKING THE POSITION AND/OR THE FOCUSING OF A FOCUSED LIGHT BEAM

[75] Inventors: Valérie Lapras, Chevalon de Voreppe; Pierre Gidon, Echirolles; Patrick Pouteau, Chevalon de Voreppe, all of France

[73] Assignee: Commissariat a l'Energie Atomique, Paris, France

[21] Appl. No.: 427,564

[22] Filed: Apr. 24, 1995

[30]     Foreign Application Priority Data

Apr. 28, 1994 [FR] France ................................ 94 05167

[51] Int. Cl.$^6$ ........................................... G02B 6/12
[52] U.S. Cl. .................... 385/14; 385/31; 385/49; 356/121; 356/122
[58] Field of Search ........................ 385/14, 4, 31, 385/49; 356/121, 122

[56]               References Cited

U.S. PATENT DOCUMENTS 4,796,226  1/1989  Valette ........................... 365/122

FOREIGN PATENT DOCUMENTS

| 0557017   | 2/1993  | European Pat. Off. . |         |
|-----------|---------|---------------------|---------|
| 0611145   | 2/1994  | European Pat. Off. . |         |
| 2606921   | 11/1986 | France              | 365/122 |
| 2692683   | 6/1992  | France              | 365/122 |
| 63-223710 | 9/1988  | Japan .             |         |
| 5099621   | 4/1993  | Japan .             |         |

OTHER PUBLICATIONS

Self-imaging In Homogeneous Planar Optical Waveguide—Ulrich et al—Applied Physics Letters, vol. 27, no. 6, 15 Sep. 1975—pp. 337–339.

Transparent Boundary Condition For Beam Propagation—Hadley—1991 Optical Society of America—pp. 624–626 No Month.

Resolution Of Self–Images In Planar Optical Waveguides—Ulrich et al—J. Opt. Soc. Am., vol. 68, No. 5, May 1978—pp. 583–592.

Light Propagation In Graded–Index Optical Fibers—Feit et al—Applied Optics, vol. 17, No. 24, 15 Dec. 1978—pp. 3990–3998.

The National Optics Institute Introduces BPM_CAD—NOI Bulletin, Nov. 1991, Quebec, Canada.

An Assessment Of Finite Difference Beam Propagation Method—Chung et al—IEEE Journal of Quantum Electronics, vol. 26, No. 8, Aug. 1990—pp. 1335–1339.

Primary Examiner—Phan T. H. Palmer
Attorney, Agent, or Firm—Burns, Doane, Swecker & Mathis LLP

[57]                 ABSTRACT

A device is provided for checking the positioning and/or the focusing of a focused light beam. This integrated optical device for checking the positioning and/or the focusing of a focused light beam having an integrated optics guidance structure includes a multimode waveguide or an array of monomode guides distributed so as to be able to exchange energy. The waveguide or monomode guide array is integrated into the guidance structure and is able, when the distribution of the light beam directed at the input of the guide or the array of guides has a single maximum, to transform the distribution into a distribution having N (N≧2) maxima at the output of the guide or array of guides. The guideance structure fruther includes a detector for measuring the distribution of the intensity at the output of the waveguide or monomode guide array, and an analyzer for analyzing the intensity distribution connected to the detector.

20 Claims, 12 Drawing Sheets

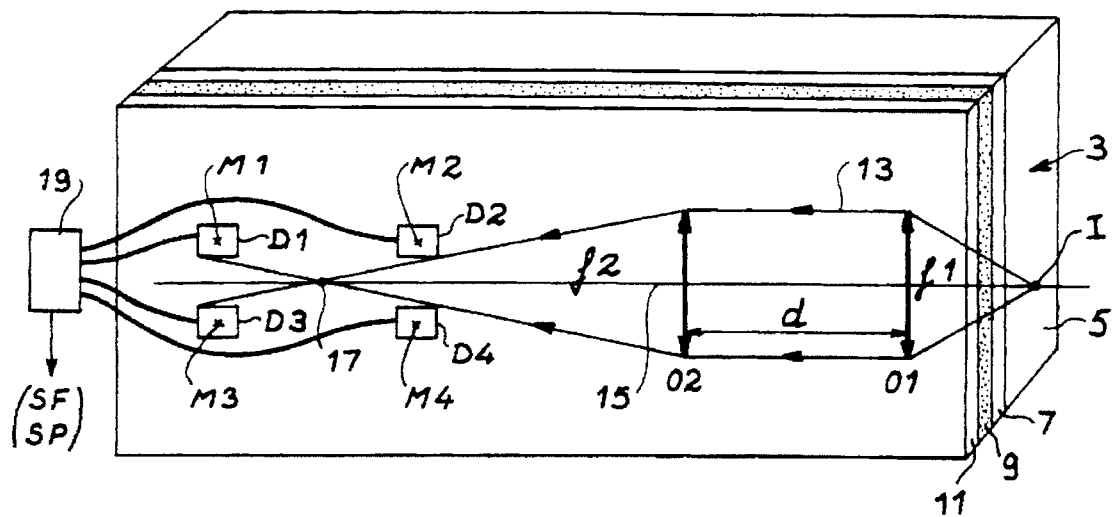
FIG._1
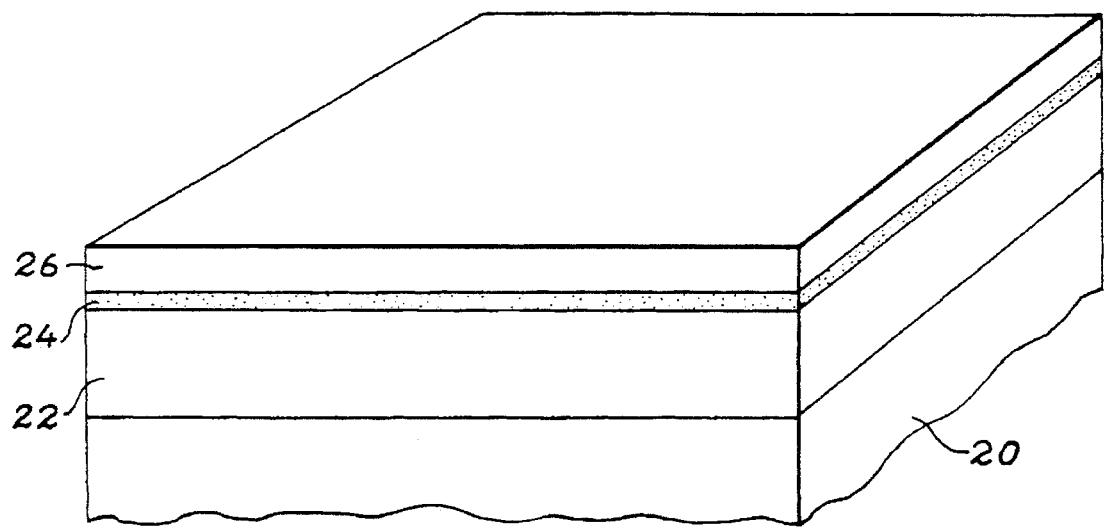
FIG._2

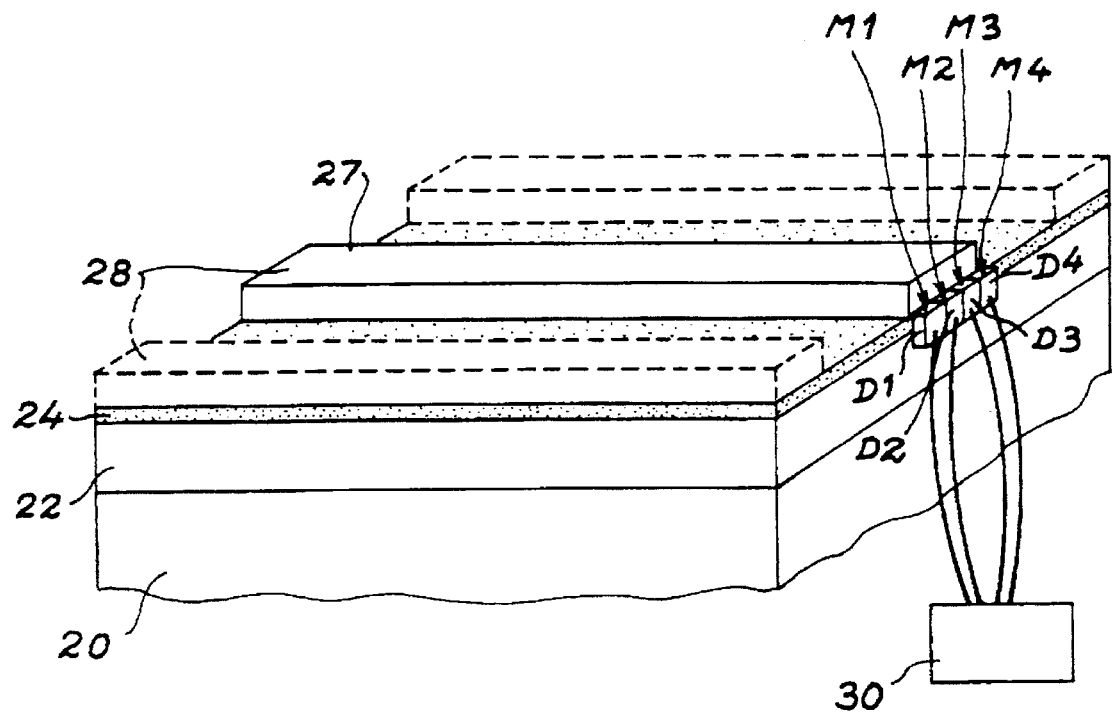
FIG._3a
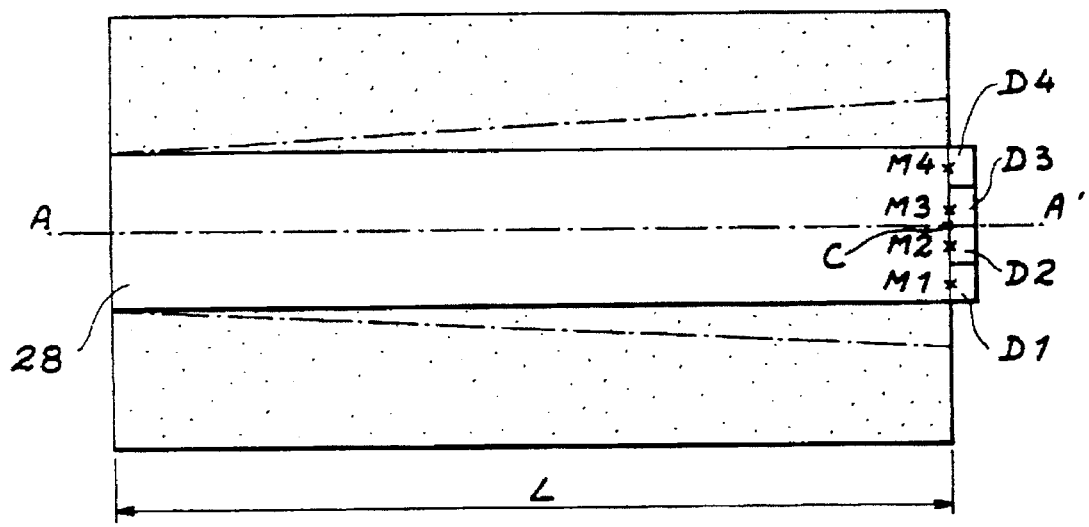
FIG._3b

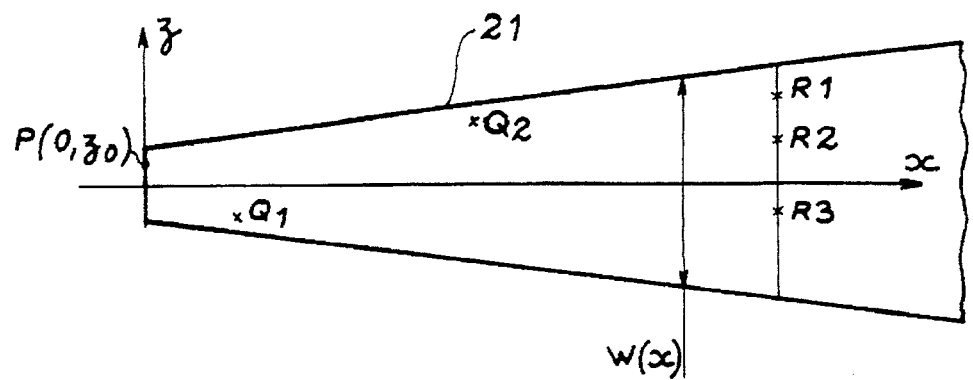
FIG._4
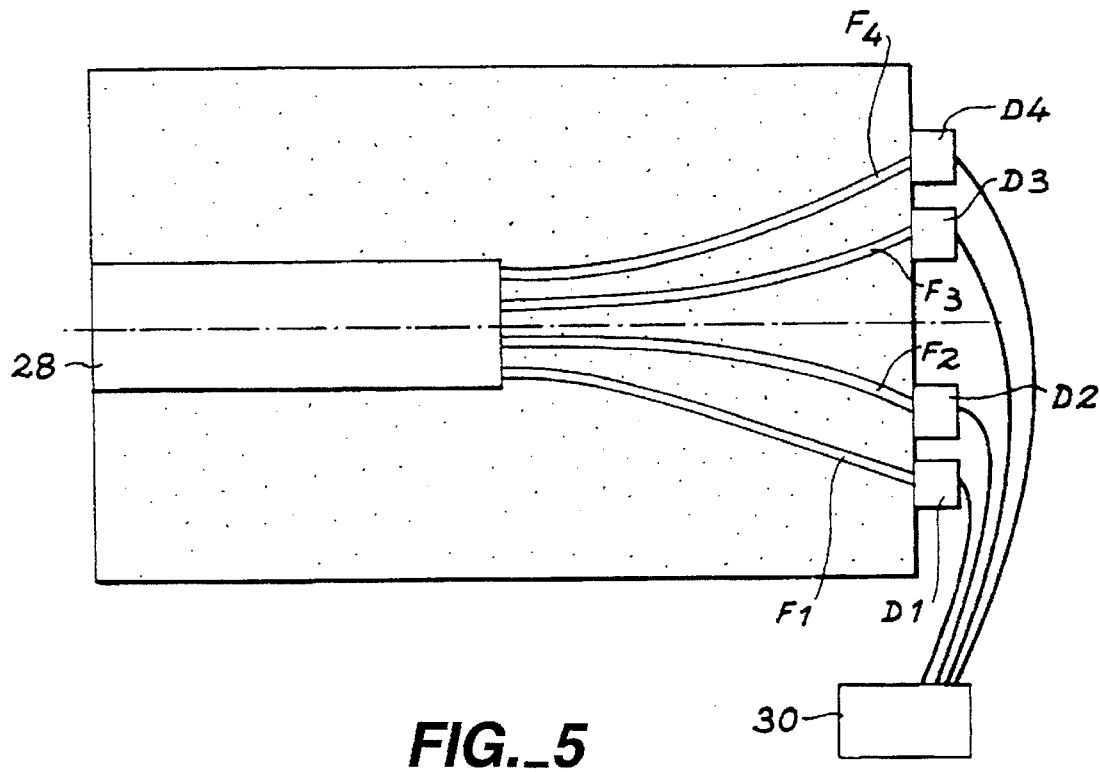
FIG._5

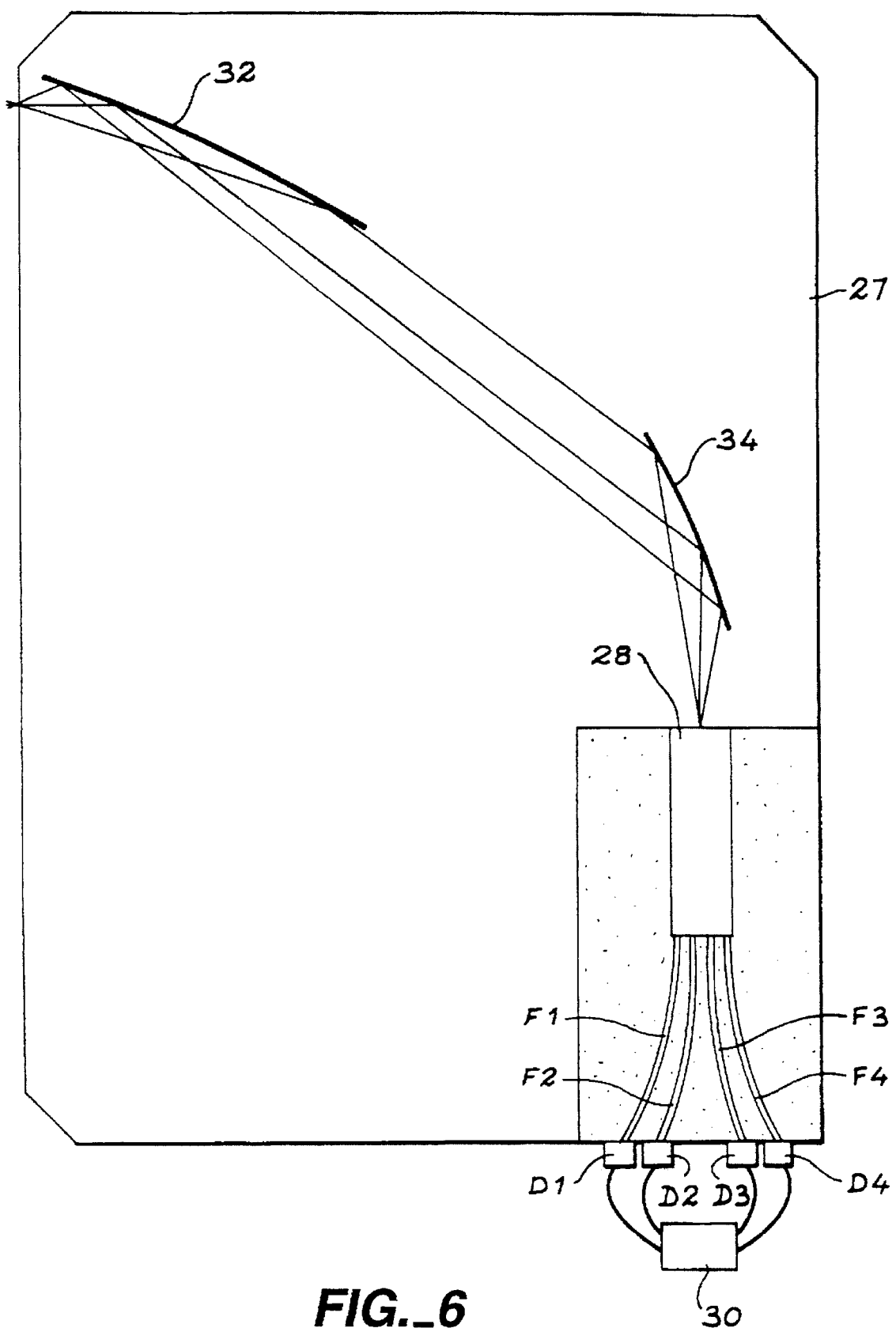
FIG._6

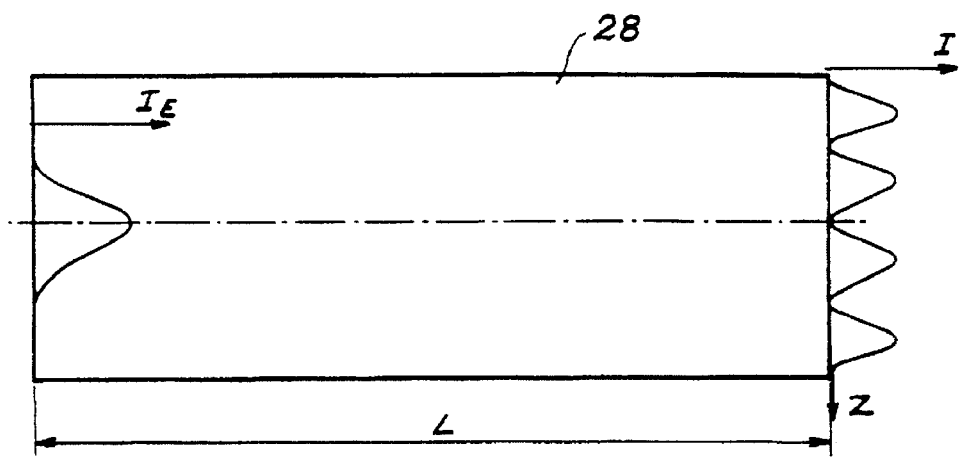
FIG._7a
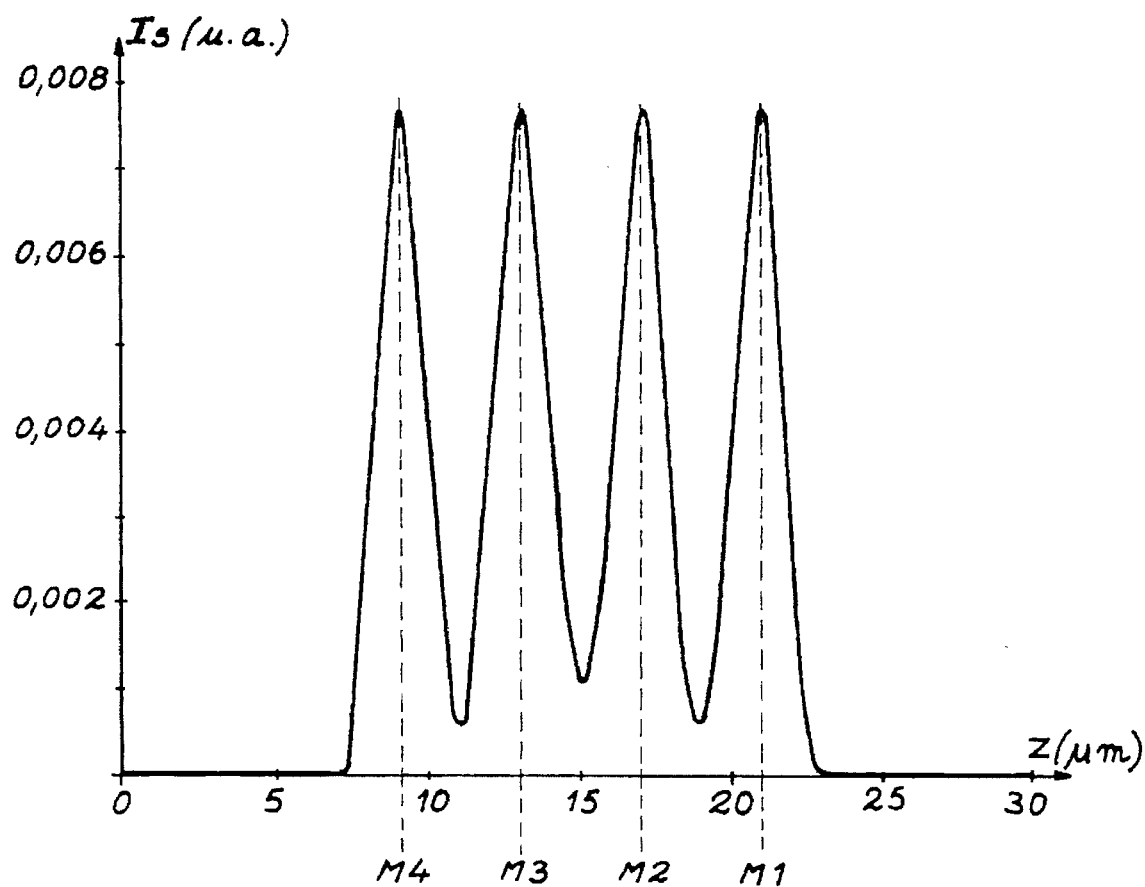
FIG._7b

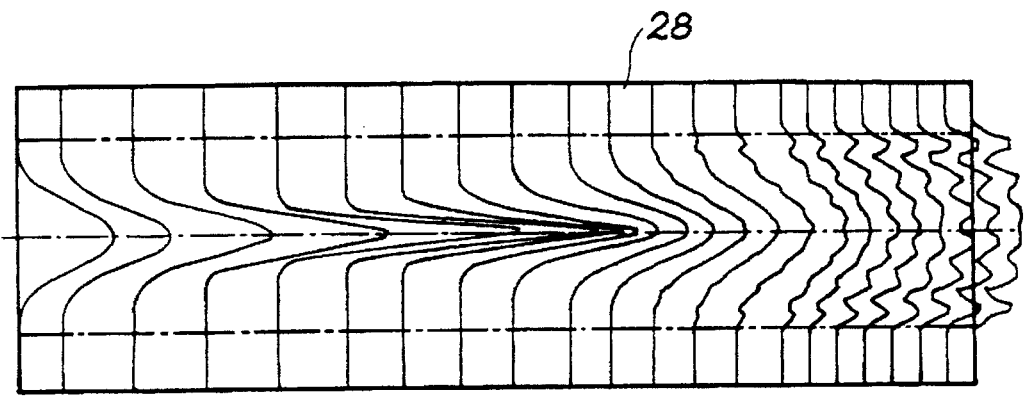
FIG._8a
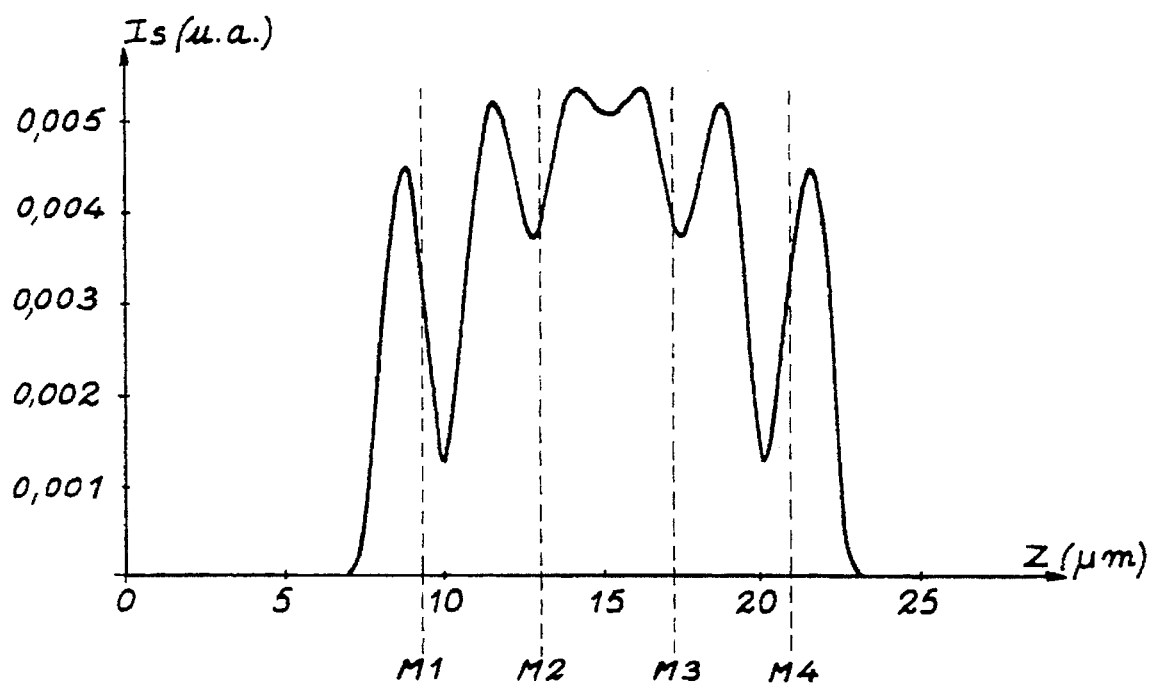
FIG._8b

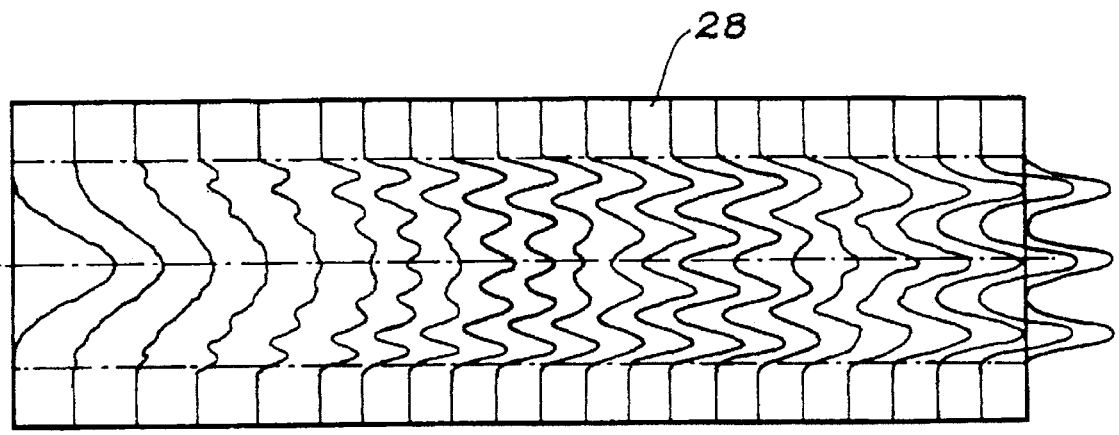
FIG._9a
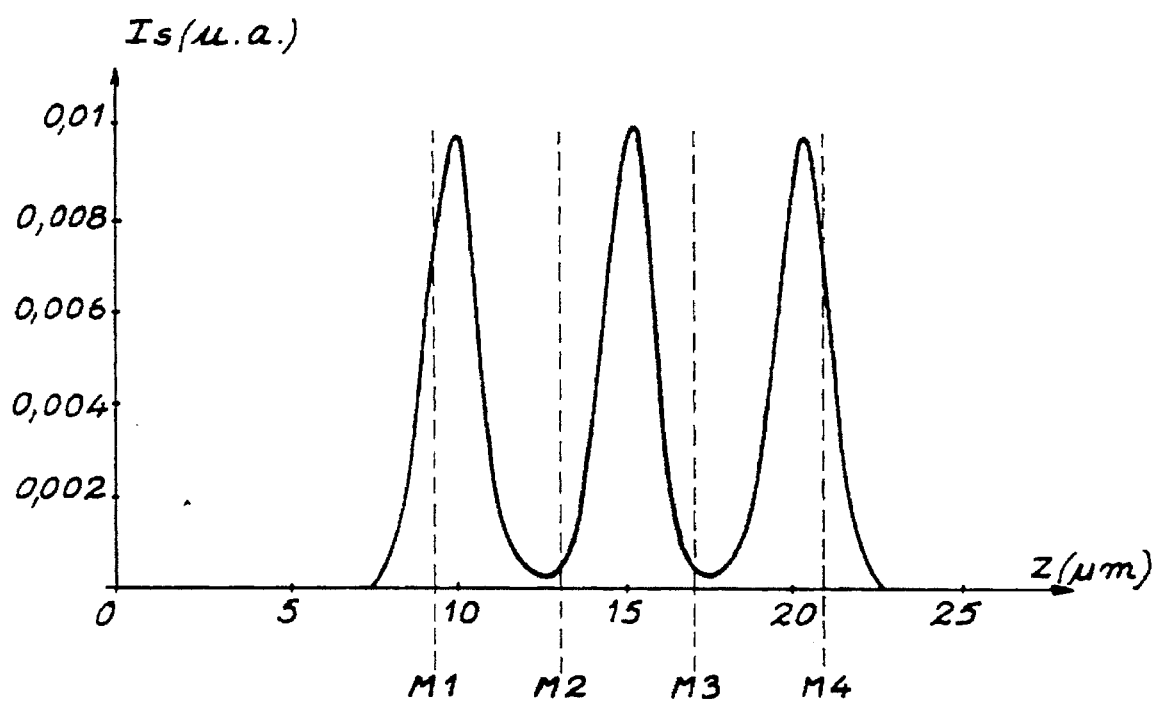
FIG._9b

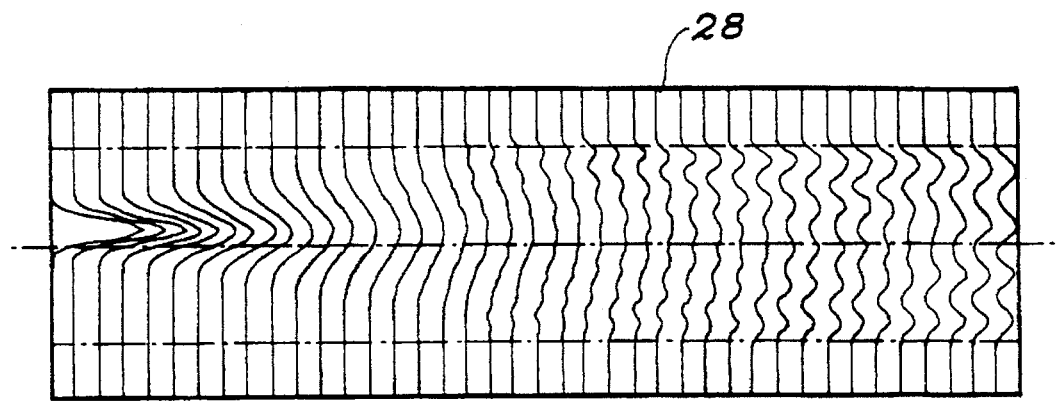
FIG._10a
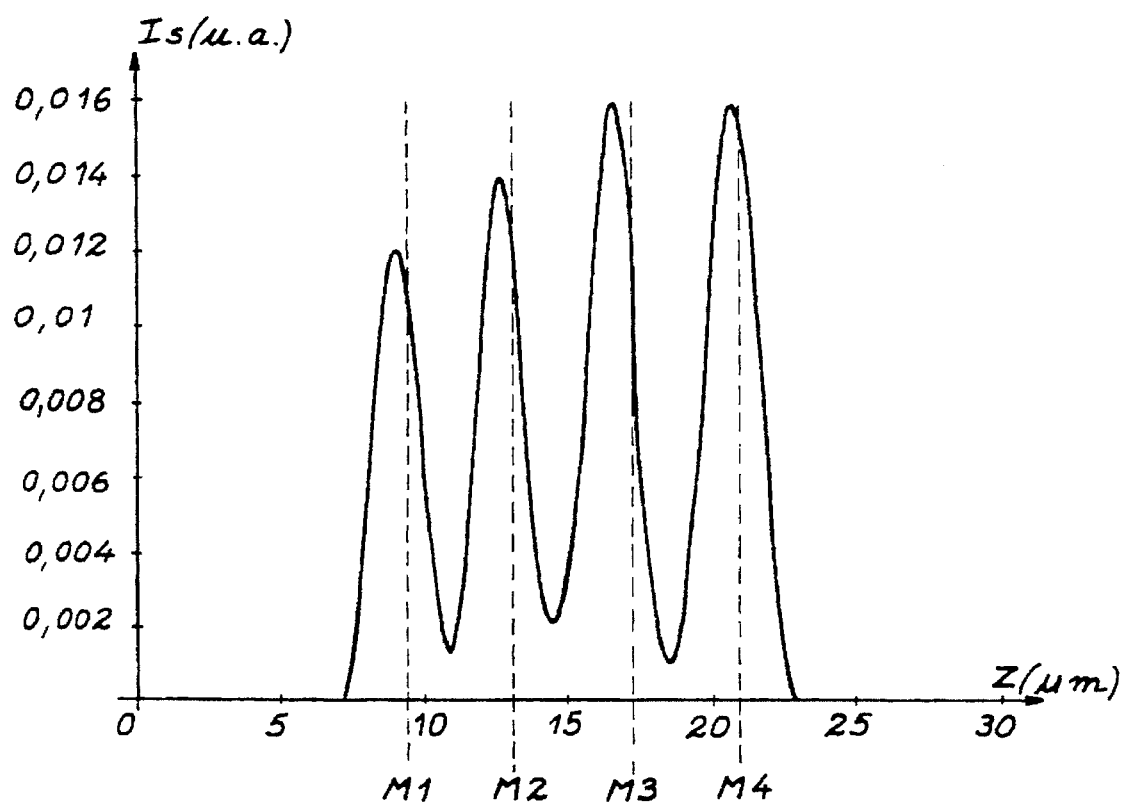
FIG._10b

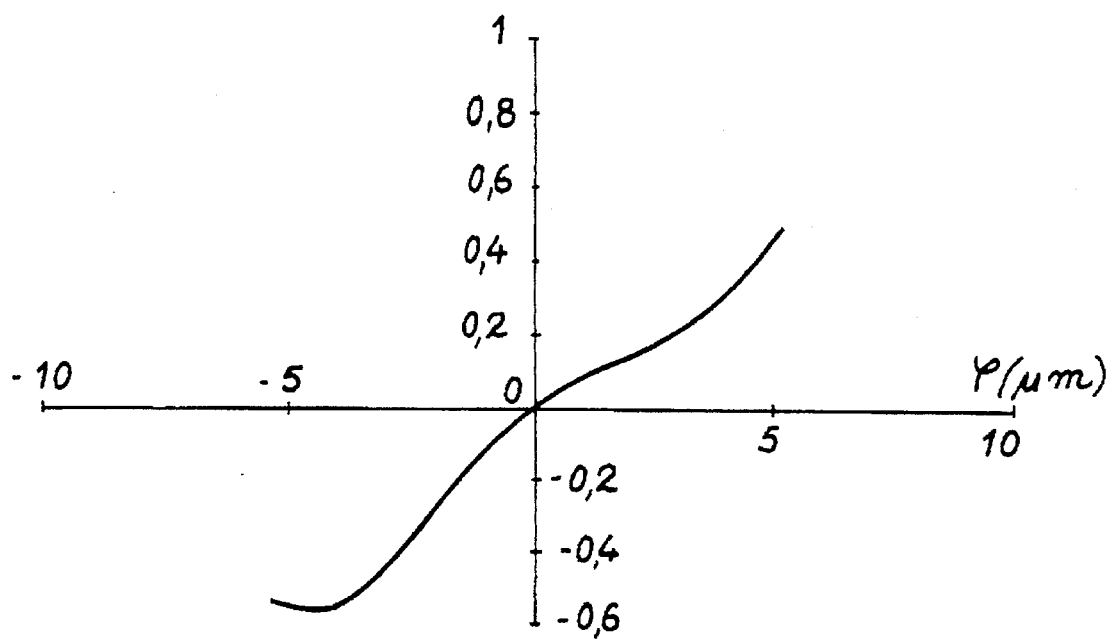
FIG._11
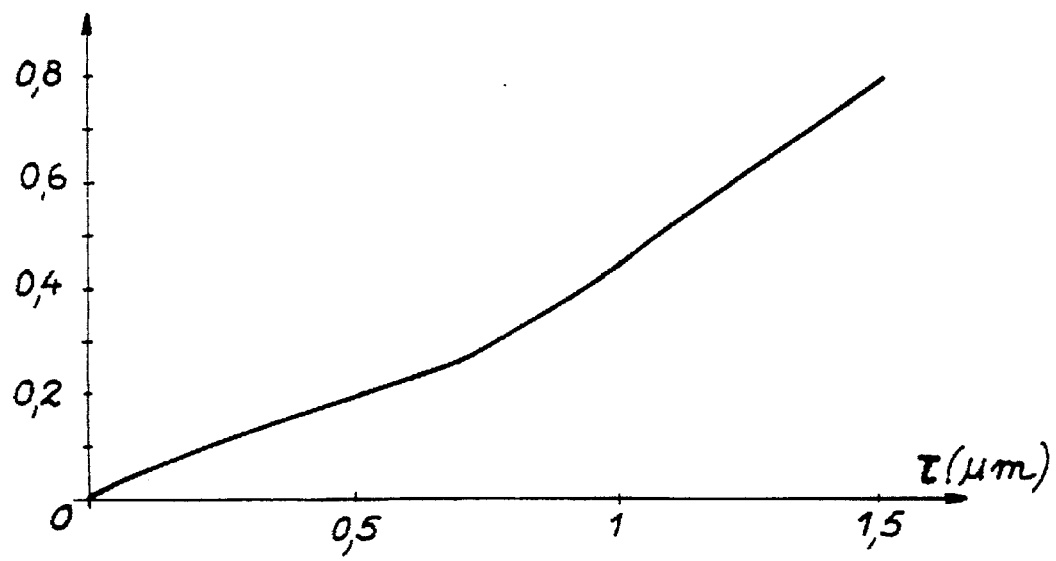
FIG._12

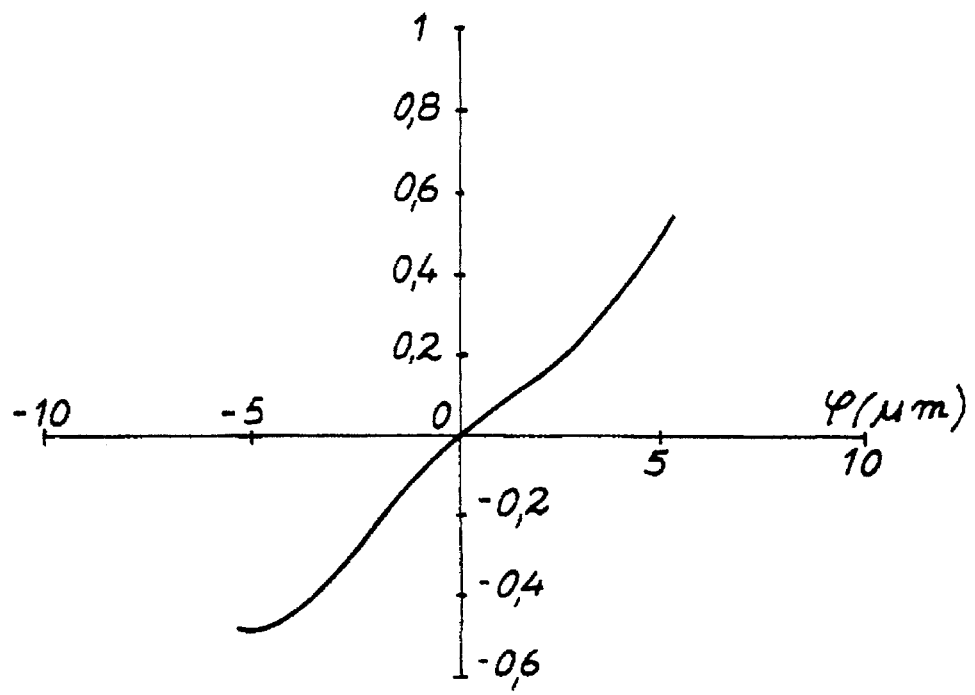
FIG._13
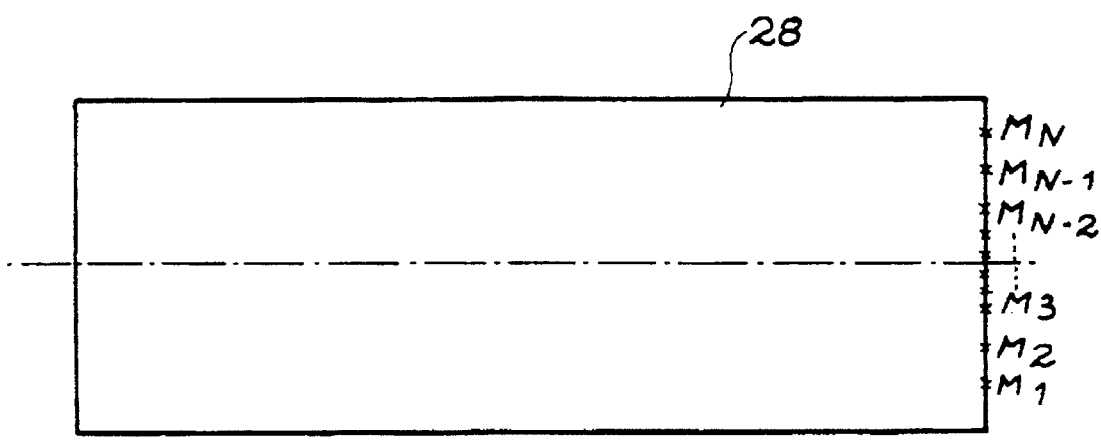
FIG._14

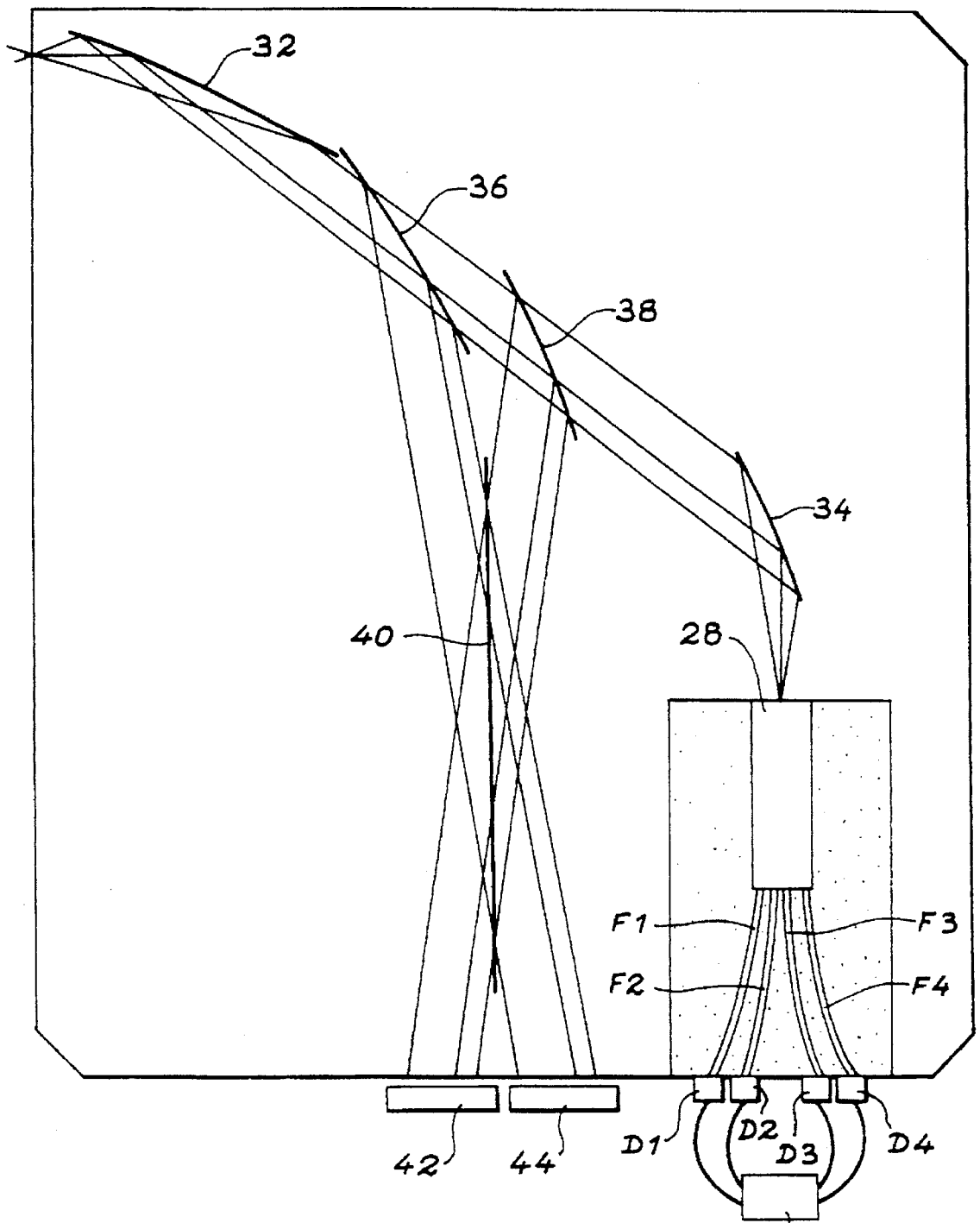
FIG._15

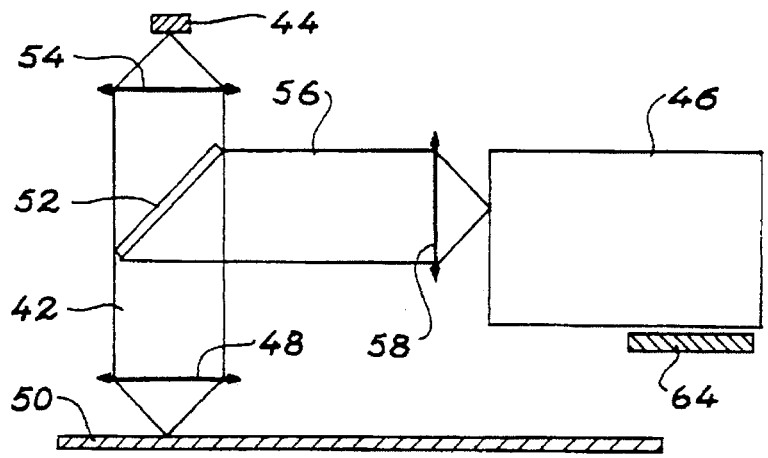
FIG._16
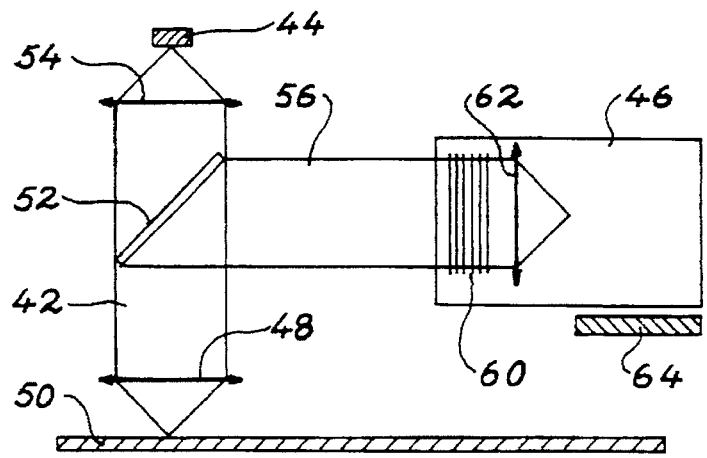
FIG._17
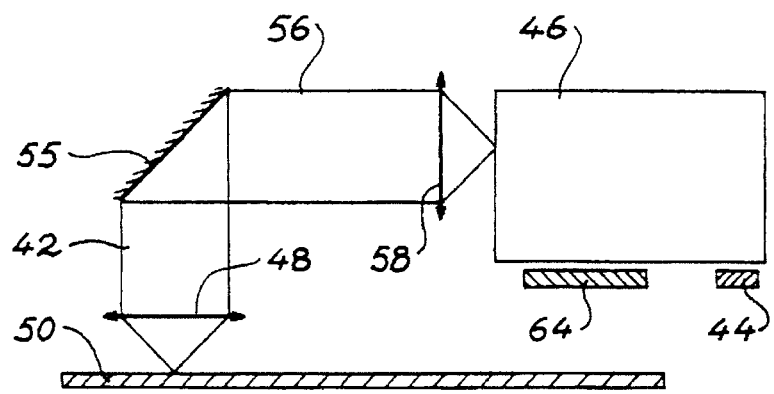
FIG._18

DEVICE FOR CHECKING THE POSITION AND/OR THE FOCUSING OF A FOCUSED LIGHT BEAM

TECHNICAL FIELD

The present invention relates to an integrated optics device for checking the focusing and the position of an image.

One of the preferred fields of application of the invention is that of optical and/or magneto-optical memories. Thus, the read heads of optical or magneto-optical memory systems generally incorporate a focusing lens on the disk, installed on a bidirectional actuator making it possible to maintain the focusing and tracking during the rotation of the disk. This operation is necessary in order to guarantee a good signal-to-noise ratio during the reading phases and a good definition of the memory points recorded on the disk during the writing phases.

The integrated optical circuit described hereinafter is used for checking the focusing and the tracking. It makes it possible to generate the corresponding error signals used for controlling the actuator.

When this device is applied to a magneto-optical read head, the checking of the position of the image becomes a check of the tracking of the recording track.

More generally, this integrated optical circuit can be used for analyzing the shape and position of a beam and can therefore apply to certain displacement transducers.

RELATED ART

An integrated optics device for checking the focusing and position of an image is known from French patent application FR-A-2 692 683.

An embodiment of this device is illustrated in FIG. 1, where it is possible to see a guidance structure 3 with a substrate 5, a first confinement layer 7, a guide layer 9 and a second confinement layer 11. In said structure are integrated:

first optics O1 having a collimating function for the light beam from an image I, said optics having a focal length $f_1$ and supplies a collimated beam 13, second optics O2 having a focusing function, separated from the first optics O1 by a distance d and which receives the collimated beam 13, said second optics having an optical axis 15, a focus 17 and a focal length $f_2$, four photodetectors $D_1$, $D_2$, $D_3$, $D_4$ located at four points $M_1$, $M_2$, $M_3$, $M_4$ all positioned in the plane of the guide layer 9, a circuit 19 for forming various sums and differences $S_F$, $S_p$ from signals supplied by the four photodetectors.

The points $M_2$ and $M_4$ are located on either side of the optical axis 15 and at a distance from the second optics O2 smaller than the focal length $f_2$. The points $M_1$ and $M_3$ are located beyond the focus 17, but are still symmetrical with respect to the axis 15. In other words, the points $M_1$, $M_2$, $M_3$, $M_4$ are the apices of a rectangle whose focus 17 is the centre. However, other arrangements are possible (trapezium, e.g. with a smaller variation between points $M_2$ and $M_4$ or larger than the variation between points $M_1$ and $M_3$, or alternatively a square).

In this example, the actual photodetectors $D_1$, $D_2$, $D_3$, $D_4$ are "hybridized" on the optical structure, i.e. are placed thereon. The circuit 19 firstly forms the sum of the signals supplied by the photodetectors $D_1$ and $D_3$ and the sum of the signals supplied by the photodetectors $D_2$ and $D_4$. It then forms the difference between these sums, i.e.:

$$S_F = (D_1 + D_3) - (D_2 + D_4)$$

where each signal is designated by the reference of the photodetector supplying it and where $S_F$ designates the focusing error signal.

In order to check the position with respect to the track, the circuit 19 calculates the position error signal $S_p$ given by:

$$S_p = (D_2 + D_3) - (D_1 + D_4)$$

During a defocusing, the beam from the optics O2 converges either before or after the focus 17, thus favouring either the pair $D_1$, $D_3$ or the second pair $D_2$, $D_4$. In both cases, the photodetector signal $S_F$ is unbalanced in one direction or the photodector other (but the signal $S_p$ remains invariant).

During a displacement of the beam with respect to a reference position (a track in the case of a magneto-optical recording), the beam is displaced in one preferred direction for the photodectors $D_2$ and $D_3$ and also in the other photodectors $D_4$ and $D_1$. In both cases, the signal $S_p$ is unbalanced (but the signal $S_F$ remains unchanged.

This device can be used autonomously on associating therewith collimating optics, or it can be combined with the integrated read head described in FR-A-2 606 921.

Although satisfactory in certain respects, this device still suffers from disadvantages. Thus, it has very significant optical losses in view of the fact that each detector $D_1$, $D_2$, $D_3$, $D_4$ only intercepts a small part of the beam. The functions of checking the focusing and tracking are interdependent in this device, it being difficult for one to function without the other and in all cases it modifies the other. The response of the device is difficult to balance in the inoperative state. There is always a difference between e.g. the intensities of the detectors $D_2+D_4$ and $D_1+D_3$, even when the beam is well focused and well positioned on the track.

The problem of the present invention is to obviate these disadvantages by proposing a device for checking the focusing and/or tracking (or the position), implemented in integrated optical form, minimizing the optical losses (because all the beam is useful), and rendering independent the two focus checking and tracking functions and which can be easily balanced in the inoperative state.

SUMMARY OF THE INVENTION

More specifically, the present invention relates to an integrated optics device for checking the position and/or the focusing of a focused light beam having an integrated optics guidance structure comprising:

a multimode waveguide or an array of monomode guides distributed so as to be able to exchange energy, which is integrated into the guidance structure and able, when the distribution of the light beam directed at the input of the guide or the guide array has a single maximum, to transform this distribution into a distribution having N maxima ($N \geq 2$) at the output of the guide or guide array, detection means able to measure the distribution of the intensity at the output of the waveguide or guide array, means for analyzing the intensity distribution connected to the detection means.

Due to the guidance of the beam in a multimode guide or an array of monomode guides, the optical losses become negligible compared with those found in the prior art device.

In addition, the checking functions, on the one hand of the position and on the other of the focusing are rendered independent, because:

when there is a variation in the position of the light beam as compared with the initial position, there is a modification of the position of the maxima at the output, surprisingly, when there is a variation of the focusing of the light beam, at the guide output there is a passage from a distribution with N maxima to a distribution with N' maxima, N' differing from N (e.g. N'=N±1).

Finally, the device is much easier to balance in the inoperative state.

The detection means can be positioned so as to be able to measure the intensity at for least N points at the output of the waveguide or guide array, referred to as measuring points. Alternatively they can have a detector able to supply a continuous image of the intensity distribution at the output of the guide.

This device can also incorporate optical means integrated into the guidance structure in order to focus the light beam at the input of the multimode waveguide or the monomode guide array and/or optical means for enlarging the light beam.

Finally, the analysis means can calculate the intensities $I_n$ ($1 \leq n \leq N$) at the N measuring points and deduce therefrom a position error signal $S_p$ and/or a focusing error signal $S_F$.

DETAILED DESCRIPTION OF THE DRAWINGS

The characteristics and advantages of the invention can be gathered from the description of non-limitative embodiments provided hereinafter with reference to the attached drawings, wherein show:

FIG. 1 A prior art, integrated optics device for checking the focusing and position of an image.

FIG. 2 A multilayer structure for preparing an integrated structure usable in a device according to the invention.

FIG. 3a Diagrammatically and in perspective, a device according to the invention.

FIG. 3b Diagrammatically and in plan view a device according to the invention.

FIG. 4 A multimode optical guide with the formation of single and multiple images of an object point P.

FIG. 5 A variant of the device using micro-guides between the measuring points and detectors.

FIG. 6 A variant of the device with an enlarging optical system.

FIGS. 7a and 7b Respectively the distribution of the intensities at the guide input and output and the detailed distribution at the output, for a correctly positioned and focused beam.

FIGS. 8a and 8b Respectively the intensity distribution at the guide input and output and the detailed distribution at the output for a forwardly defocused beam.

FIGS. 9a and 9b Respectively the intensity distribution at the guide input and output and the detailed distribution at the output for a rearwardly defocused beam.

FIGS. 10a and 10b Respectively the intensity distribution at the guide input and output and the detailed distribution at the output for a beam whose position is displaced.

FIGS. 11 and 13 The response of the checking circuit as a function of a focusing error respectively without and with a position error.

FIG. 12 The response of the checking circuit as a function of a position error.

FIG. 14 A guide and N measuring points at the output.

FIG. 15 A complete, integrated detection circuit for a conventional read/write head.

FIGS. 16 to 18 Examples of a conventional magneto-optical read head equipped with an integrated detection device according to the invention.

DETAILED DESCRIPTION OF EMBODIMENTS

An integrated optical device according to the invention is illustrated in FIGS. 3a and 3b. This device comprises an integrated optics guidance structure formed from a structure illustrated by FIG. 2 and having a substrate 20, e.g, of silicon, a first confinement layer 22, e.g. of silica $SiO_2$ of index 1.45, a guidance layer 24, e.g. of $Si_3N_4$ of index 1.99 and a second confinement layer 26, e.g. of $SiO_2$ and of index 1.47 (these indices are given for $\lambda$=0.78 μm). The thicknesses of the first and third layers are respectively approximately 2 and 1 μm and that of the intermediate layer is between 100 and 200 nm, e.g. 165 nm.

The device according to the invention is not limited to this structure, although the numerical examples given hereinafter relate to this particular case.

Thus, this device can be produced on any random integrated optics structure. In particular, it can be produced in glass, lithium niobate, in multilayer semi-conductor structures such as III- V or II - VI structures.

For examples, it is possible to use one of the following structures:

glass/glass doped by ion exchange/$SiO_2$, $LiNbO_3$/$LiNbO_3$ doped by titanium diffusion/$LiNbO_3$, In these two first cases, the first confinement layer or buffer layer coincides with the substrate, Si/$SiO_2$/$Si_3N_4$/$SiO_2$, Si/$SiO_2$/$SiO_xN_y$/$SiO_2$ with $0 \leq x \leq 2$ and $0 \leq y \leq 4/3$, Si/$SiO_2$/$SiO_2$/doped $SiO_2$, the dopants of the guide layer being such that the latter has a refractive index higher than that of the adjacent layers, such as e.g. phosphorus, germanium, titanium or nitrogen.

It is also possible to replace the $Si_3N_4$ guide layer by alumina and/or to dope the silica used as the buffer layer and as the upper layer of the guidance structure by a dopant decreasing the refractive index of the silica such as fluorine or by a dopant increasing the refractive index of the silica. Obviously, the guide layer must always have a refractive index higher than that of the buffer layer and that of the upper layer associated therewith.

A process for the production of such a structure uses conventional layer or coating deposition procedures. Reference can be made among these to plasma assisted chemical vapour deposition (PECVD) particularly in the case of silica ($SiO_2$) layers, or alternatively other chemical vapour deposition processes such as flame hydrolysis and low pressure chemical vapour deposition (LPCVD), particularly in the case of silicon nitride ($Si_3N_4$) layers.

In addition, when these layers have the same basic constituent, e.g. silica, in order to have a refractive index difference, a doping takes place of one, several or all the layers by known methods among which reference can be made to the use of chemical reactions in the presence of reactive gases, ion implantation and the diffusion of ions or miscellaneous atoms.

A multimode waveguide, e.g. a microguide is produced on a guidance structure like that of FIG. 2 and described hereinbefore. The term multimode guide is understood to mean a guide having at least, in one of its directions (either the direction contained in the plane of the layers, or the direction perpendicular to said plane) several propagation modes, whereby the other direction can have a single propagation mode. Such microguides are e.g. produced by partial or total etching of the upper confinement layer or the guide layer using conventional procedures, e.g. photolithography with masking.

When the upper confinement layer is etched, a structure like that illustrated in FIG. 3a is obtained, where the references 20, 22, 24 have the same meanings as in FIG. 2 and wherein the reference 27 designates the etched layer. The microguide 28 is defined and formed by the superimposing of three layers 22, 24 and 27. Thus, it is also possible to have a plurality of microguides on the same structure, as illustrated in broken line form in FIG. 3a. The microguide 28 has been shown in straight form, but it can also be funnel-shaped, as illustrated in broken line form in FIG. 3b. If the guide is straight, it will have a width of approximately 10 to a few dozen μm, e.g. 15 μm. The multimode guide 28 has an axis of symmetry, designated in FIG. 3b by (AA'), no matter whether the guide is straight or funnel-shaped.

The length L of the multimode guide 28 is such that when an incident beam I directed onto the entrance or input section of the guide has an intensity distribution with a single maximum, an output or exit beam with a maximum number N is obtained with $N \geq 2$.

The conditions for obtaining such a result are e.g. given by the analytical method described for multimode guides in an article by R. Ulrich et al entitled "Self imaging in homogeneous planar optical waveguides", published in Applied Physics Letters, vol.27, no.6, 15.9.1975, pp.337–339.

According to this article and as illustrated in FIG. 4, for any parallel or funnel-shaped, multimode guide 21 and for any object point P within the guide, there is a certain number of single, real images of P at different points $Q_1$, $Q_2$, $Q_3$ etc. of the guide, downstream of P in the light propagation direction and, at intermediate positions, multiple images of P (e.g. at $R_1$, $R_2$ and $R_3$ in FIG. 4).

The problems of aberrations and also resolution are also dealt with in the article by R. Ulrich et al entitled "Resolution of self-images in planar optical waveguides", published in Journal of Optical Society of America, vol.68, no.5, 1978, pp.583–592.

No matter what the characteristics of the multimode guide, it is possible to determine the length necessary for obtaining an intensity distribution with several maxima at the output for a distribution with a single maximum at the input, by applying digital methods like the "beam propagation method" and its variants described in the article by M. D. Feit et al ("Light propagation in graded-index optical fibers", Applied Optics 1978, vol.17, no.24, pp.3990–3998), G. R. Hadley ("Transparent boundary condition for beam propagation", Optics Letters, 1991, vol.16, no.9, pp.624–626) and in the article by Chung et al ("An assessment of Finite Difference Beam propagation method", IEEE Journal of Quantum Electronics, vol. 26, no.8, pp.1335–1339, 1990). This digital calculation method, which is based on the resolution of the wave equation is more accurate than the aforementioned analytical method. Computer software is commercially available which is based on this digital method (e.g., the BPM CAD described in National Optics Institute Bulletin, Special Edition, November 1991, Quebec, Canada).

Alternatively it is possible to use, in place of a wide multimode guide 28, several preferably parallel monomode guides, which are sufficiently close to one another for their modes to be able to exchange energy. In practice, adjacent monomode guides can be located at a distance less than 10 μm and preferably less than 5 μm from one another. The width of a single monomode guide is approximately 1 to 2 μm. The length necessary for obtaining the same result as with a multimode guide, i.e. an intensity distribution with several maxima at the output for an intensity distribution with a single maximum at the input, is obtained by e.g. applying the same digital methods as referred to hereinbefore. As in the case of multimode guides, the monomode microguides are then obtained by etching according to the aforementioned methods.

The integrated optical device also incorporates devices for measuring the intensity distribution at points $M_1$, $M_2$ etc. at the output of the multimode guide (or monomode guides) —hereinafter use will be made of the example of a multimode guide because the considerations relative to the detection are the same in both cases.

If the output of the guide is planar and perpendicular to the axis of symmetry (AA'), the devices are located in a plane perpendicular to said axis and close to the output or exit of the guide. They are also symmetrically distributed with respect to the centre of the multimode guide exit located on the axis (AA'), as can be seen in FIG. 3b.

These devices can be constituted by a plurality (at least two being required) of photodetectors $D_1$, $D_2$ etc. respectively located at points $M_1$, $M_2$ etc. connected to an analyzer 30 for measuring the signals supplied by each photodetector and from which it is possible to deduce the relative intensity $I_i$ at the output of the guide for each of the points $M_i$. There can also be several detectors per measuring point.

The processing of the signals by the analyzer 30 can take place in several ways. Thus, it is e.g. possible to digitize each signal supplied by a photodetector using an analog—digital converter and then carry out the processing in digital form with the aid of a microprocessor. It is also possible to process in analog form the signals supplied by the photodetectors with the aid of circuits of the amplifier or operational amplifier type.

The analyzer 30 also integrates devices for performing several operations on the measured quantities, particularly operations of combining these quantities with one another and which will be described hereinafter. It can obviously also integrate any device necessary for data storage.

The photodetectors can be integrated into the multilayer structure or joined thereto, as is illustrated in FIGS. 3a and 3b, where the photodetectors are located directly at the output of the multimode guide, but they can also be connected at points $M_i$ by microguides or optical fibres $F_i$, according to a variant illustrated in FIG. 5. In the latter case, each of the photodetectors $D_i$ can also either be integrated to or joined to the corresponding guidance structure $F_i$.

Alternatively the detection can take place by a "continuous" detector, e.g. a photodetector array or a camera making it possible to obtain an "image" of the intensity distribution at the output of the multimode guide, the focusing and/or position error signal being very precisely obtained by comparison with previously recorded and/or calculated, theoretical intensity distributions or, more generally, with reference intensity distributions. These signals can also be obtained as in the case of point detectors by comparing the intensities at certain points or groups of points, e.g. in the manner described hereinafter.

The integrated optical device according to the invention can also incorporate focusing optics and/or collimating optics, the combination of the two making it possible to obtain an enlargement or an amplification of defocusing and/or the position error of the checked or controlled beam. Such a variant is illustrated in FIG. 6, which shows an integrated optics structure like that described hereinbefore, in the version in which the detectors $D_i$ are connected to measuring points $M_i$ by microguides or optical fibres $F_i$ and with a multimode waveguide 28. The array is integrated onto a structure 27 onto which are also integrated:

first optics 32 having a collimating function for the incident light beam, the first optics having a focal length $f_i$ and can be constituted by e.g. a parabolic mirror;

second optics 34 having a focusing function and separated from the first optics by a distance d and which receives the beam collimated by the first optics 32, said second optics having an optical axis, a focus and a focal length $f_2$ and can also be a parabolic mirror;

the input or entrance of the multimode waveguide is placed at the focus of the second optics 34 and its axis (AA') is aligned with the optical axis of the second optics 34.

An effect of "amplifying" focusing and position errors can be obtained with such a system. For this purpose a choice will be made of $f_2 > f_1$ and $d >> f_2$ and $f_1$. Thus, a focusing error z at the input of the system will lead to a focusing error $$\left(\frac{f_2}{f_1}\right)^2 z$$

Z at the input of the multimode guide, whilst a position error x at the system input will lead to an error $$\left(\frac{f_2}{f_1}\right) x$$

at the input of the multimode guide and therefore at the output of the system of two optics 32 and 34.

The operation of a device according to the invention will now be described in the case of four detectors $D_1$, $D_2$, $D_3$ and $D_4$ at the guide output.

The width W and length L of the guide are chosen in such a way that, if the system is inoperative, i.e. if the input beam $I_E$ has an intensity distribution with a single maximum, centred on the axis of symmetry of the guide, at the output an intensity distribution with four maxima will be obtained at four points $M_1$, $M_2$, $M_3$, $M_4$ distributed symmetrically with respect to the axis of symmetry of the guide (it is also said that four images are obtained at the output). This situation is illustrated in FIGS. 7a and 7b for a guide having the following characteristics:

integrated optical structure of the type $Si/SiO_2/Si_3N_4/SiO_2$, multimode guide in the direction contained in the plane of the layers of width W=15 μm obtained by total etching of the substrate of length L=136 μm, λ=0.78 μm, $n(SiO_2)$=1.45 (layer 22), $n(Si_3N_4)$=1.99 (layer 24), $n(SiO_2)$=1.47 (layer 26), "enlarging" optical system of magnification 3.

FIG. 7a diagrammatically shows the distribution of the intensities at the input and output of the guide. FIG. 7b shows in greater detail the distribution of the images at the output. In the inoperative state, the intensities $I_1$, $I_2$, $I_3$, $I_4$ respectively measured at points $M_1$, $M_2$, $M_3$, $M_4$ are equal: $I_1, I_2, I_3, I_4$, and $$\begin{cases} S_F = (I_2 + I_3) - (I_1 + I_4) = 0 \\ S_P = (I_1 + I_2) - (I_3 + I_4) = 0 \end{cases}$$

When the input beam remains centred, but is forwardly defocused, the intensity distribution at the guide input is modified, as is the output distribution, which evolves towards a symmetrical distribution with 5 images. This is illustrated in FIGS. 8a and 8b, the first showing the evolution of the image in the multimode guide and the second the detailed intensity distribution at the guide output. The intensity measured at points $M_2$ and $M_3$ exceeds that measured at points $M_3$ and $M_4$. The signal $S_F=(I_2+I_3)-(I_1+I_4)$ is unbalanced the positive sense. The signal $S_p=(I_1+I_2)-(I_3+I_4)$ remains zero, because $I_1=I_4$ and $I_2=I_3$ (cf. FIG. 8b).

When the input beam remains centred, but is rearwardly defocused, the intensity distribution at the guide input is modified, as is the output distribution which evolves towards a symmetrical distribution with 3 images. This is illustrated in FIGS. 9a and 9b, the first showing the evolution of the image in the multimode guide and the second the detailed intensity distribution at the guide output. The signal $S_F=(I_2+I_3)-(I_1+I_4)$ is unbalanced in the negative sense. The signal $S_p=(I_1+I_2)-(I_3+I_4)$ still remains zero, because $I_1=I_4$ and $I_2=I_3$ (cf. FIG. 9b).

Consequently, in each of these two first cases, the symmetry of the distribution of the images with respect to the axis AA' is retained and the signal $S_p$ is never affected. In addition, when it is a question of checking the focusing, the analyzer 30 will calculate $S_F=(I_2+I_3)-(I_1+I_4)$.

When the input beam is off centred (but not defocused), i.e. when there is a tracking or position error in one direction, the intensity distribution at the output of the multimode guide is unbalanced and on this occasion asymmetrically with respect to the axis AA'. This is illustrated in FIGS. 10a and 10b, the first showing the evolution of the image in the multimode guide and the second the detailed intensity distribution at the guide output.

The signal $S_p=(I_1+I_2)-(I_3+I_4)$ is unbalanced in the negative sense, whereas the signal $S_F=(I_2+I_3)-(I_1+I_4)$ remains substantially zero.

When there is a tracking or position error in the other sense or direction, the signal $S_p$ is unbalanced in the positive sense, $S_F$ remaining zero.

Thus, in the case of a tracking error, the measuring points placed on one side of the optical axis are preferred compared with those on the other side. In addition, when it is a question of checking the position relative to the track, the analyzer 30 will calculate the signal $S_p$ given by $S_p(I_1+I_1)-(I_3+I_4)$.

Still in the case of a system having the same characteristics as those referred to hereinbefore (W=15 μm, L=136 μm), FIGS. 11 and 12 show the standardized signals respectively obtained for measuring the defocusing and measuring the position error, as a function of the focusing error φ and the tracking error τ, both expressed in μm. These standardized signals constitute error signals for controlling an actuator (galvanometric or piezoelectric or any other type), which will displace the optical device in order to correct the focusing and/or position errors.

FIG. 13 shows the response of the focusing control circuit in the presence of a small position error (τ=0.2 μm). It can be seen that the standardized curve obtained is substantially identical to that of FIG. 11, which shows the independence of the tracking and focusing control functions. This independence is explained by the fact that the effects involved during the measurement of the defocusing (passage from 4 to 3 or 5 maxima) are of a different nature from those involved during tracking measurement.

The operation of the device has been explained in the case of 4 detectors for 4 images at the output of the multimode guide.

It is also possible to use a waveguide, whose length and width are such that, in the inoperative state and for an input-centred image, 2 images are obtained instead of 4 at the guide output. In this case, two detectors $D_1$ and $D_2$ are preferably positioned in such a way as to measure the guide output intensity at symmetrical points on either side of the optical axis.

It is then only possible to obtain one tracking or position error signal, which is proportional to the difference of the signals supplied by each of the detectors $S_p = I_1 - I_2$.

If the guide is such that, in the inoperative state, for an input-centred image 3 images are obtained at the output, 3 detectors $D_1$, $D_2$, $D_3$ must make it possible to detect the intensity at 3 guide output points. One of these detectors ($D_2$) e.g. makes it possible to measure the intensity on the optical axis and the two others ($D_1$ and $D_3$) at points $M_1$ and $M_3$ symmetrical with respect to the optical axis and namely where the maxima form at the guide output in the inoperative state.

The position error signal is given by or is proportional to $S_p = I_1 - I_3$. The focusing error signal is $S_F = I_2 - (I_1 + I_3)$.

The case of 4 output images has been dealt with hereinbefore.

It remains necessary to deal with the case of a guide, whose characteristics are such that, in the inoperative state and for an input-centred image, N output images are obtained (with N>4).

The N detectors or N optical fibres will e.g. be symmetrically distributed with respect to the optical axis, so as to detect the intensity at points $M_i$ (i=1 . . . N) where guide output maxima form when the input beam is correctly positioned and focused (cf. FIG. 14, where the reference 28 designates the multimode guide).

If N is even, $$\frac{N}{2}$$

detectors will be positioned so as to be able to detect the intensity at $$\frac{N}{2}$$

points positioned on one side of the axis and $$\frac{N}{2}$$

other detectors so as to detect the intensity at $$\frac{N}{2}$$

other points symmetrical with respect to the $$\frac{N}{2}$$

first points with respect to the optical axis.

If N is uneven, $$\frac{N-1}{2}$$

detectors will be positioned so as to be able to detect the intensity at $$\frac{N-1}{2}$$

points on one side of the axis and $$\frac{N-1}{2}$$

other detectors at $$\frac{N-1}{2}$$

other points on the other side of the axis, the $$\frac{N+1}{2}$$

order detector detecting the guide output intensity on the optical axis.

The tracking or position error signal $S_p$ will be proportional to:

$$\text{if } N \text{ is even } \sum_{k=1}^{N/2} I_k - \sum_{k=\frac{N}{2}+1}^{N} I_k,$$

$$\text{if } N \text{ is uneven: } \sum_{k=1}^{\frac{N-1}{2}} I_k - \sum_{k=\frac{N+3}{2}}^{N} I_k$$

It is possible to obtain a position error signal without using all the detectors. In this case, it is sufficient to compare the signals supplied by one or more detectors located on the same side with respect to the optical axis with signals supplied by the detector or detectors positioned symmetrically with respect to the optical axis. For example, $S_p$ can be proportional to $D_N - D_1$ or to $(D_N + D_{N-1}) - (D_1 + D_2)$.

In more general terms, $S_p$ can be proportional to:

$$\text{if } N \text{ is even: } \sum_{k=1}^{N/2} \alpha_k I_k - \sum_{k=\frac{N}{2}+1}^{N} \alpha_{N-k+1} I_k$$

$$\text{if } N \text{ is uneven: } \sum_{k=1}^{\frac{N-1}{2}} \alpha_k I_k - \sum_{k=\frac{N+3}{2}}^{N} \alpha_{N-k+1} I_k,$$

with $\alpha_k = 0$ or 1 for any k, the value of each $\alpha_k$ being fixed by the user.

With regards to the focusing error signal, the principle is to form a first sum of a group of signals measured at points all located on the same side with respect to the optical axis, add thereto a second sum of a group of signals measured at points positioned symmetrically with respect to the optical axis and compare said total sum with that of the signals measured at complementary points.

Thus, the focusing error signal $S_F$ will be e.g. proportional to:

if $N = 4m$: $\left( \sum_{k=1}^{m} I_k + \sum_{3m+1}^{N} I_k \right) - \sum_{k=m+1}^{3m} I_k$, if $N = 4m + 1$: $\left( \sum_{k=1}^{m} I_k + \sum_{3m+2}^{N} I_k \right) - \sum_{m+1}^{3m+1} I_k$, if $N = 4m + 2$: $\left( \sum_{k=1}^{m+1} I_k + \sum_{3m+2}^{N} I_k \right) - \left( \sum_{m+2}^{3m+1} I_k \right)$, or $\left( \sum_{k=1}^{m} I_k + \sum_{3m+3}^{N} I_k \right) - \sum_{m+1}^{3m+2} I_k$ if $N = 4m + 3$: $\sum_{k=1}^{m+1} I_k + \sum_{k=3m+3}^{N} I_k - \sum_{m+2}^{3m+2} I_k$ Other combinations of $(I_k)_{k=1,\ldots,n}$ can be envisaged, the above formulas only constituting examples.

These formulas or combinations can also apply when a "continuous" detector is present at the guide output, because it is then easily possible to measure the intensities at N points.

The device described hereinbefore is perfectly suitable for integrated optics structures. In particular, it can be combined with the magneto-optic read head described in EP 270 429 (U.S. Pat. No. 4,796,226) in order to form therefrom a complete, integrated detection circuit, compatible with conventional read/write heads. Such an integrated circuit is shown in FIG. 15, where the references 28, 30, 32, 34, $F_1$-$F_4$, $D_1$-$D_4$ designate the same elements as in FIG. 6. The references 36 and 38 respectively designate a polarization separator and a polarization converter, the reference 40 a semireflecting plate and the references 42 and 44 two photodetectors. The group of elements 36, 38, 40 constitutes an interferometric system. The circuit functions in the following way. The light reflected by a magneto-optical disk has its polarization direction turned by an angle $\pm\theta_F$ according to the information written on the disk (0 or 1). During the coupling in the integrated optical circuit, said light is broken down on the two propagation modes TE and TM of the integrated optic structure. The polarization separator 36 then makes it possible to separate the TE (transmitted) and TM (reflected modes). The polarization converter 38 makes it possible to generate a beam TM (whose phase is fixed) from the beam TE. The semireflecting plate 40 makes it possible to bring about interference between the two beams TM (TM signal, whose phase represents the information to be detected and TM converted). Thus, two measuring channels in phase opposition are obtained, which make it possible to perform a differential detection (42, 44). In parallel, the converter 38 transmits part of the beam TE, which is focused by the mirror 34 at the entrance of the guide 28. This beam TE is then analyzed to check the position and/or focusing of the light reflected by the disk, as described hereinbefore.

FIGS. 16 to 18 are examples of conventional magneto-optic read heads equipped with an integrated detection device. A beam 42 is emitted by a laser diode 44, which can be external (FIGS. 16 and 17) of the integrated optical circuit 46 incorporating a checking device according to the invention, or can be integrated into or hybridized on said circuit (FIG. 18). A focusing device 48 for focusing the beam 42 on an optical or magneto-optical disk 50. The references 52 and 54 in FIGS. 16 and 17 respectively designate a cube or semireflecting plate and a collimating lens. Reference 55 in FIG. 18 designates a mirror.

The reflected beam 56 traverses a coupling objective 58 (FIGS. 16 and 18) or a coupler network 60 and a focusing device 62 (FIG. 17) before entering a checking device according to the invention, which is not shown in detail in FIGS. 16 to 18. Reference 64 designates the detector system at the output of the multimode guide (or the plurality of monomode guides) of said device.

In such devices, on the basis of error signals $S_p$ and $S_F$ determined by the checking device, a servosystem or a correction device located between the analyzer 30 of the device and the optical device 48 can be provided for maintaining the position and focusing of the beam 42 on a given track of the disk.

We claim:

1. An integrated optics device for checking at least one of the position and the focusing of a light beam having an integrated optics guidance structure comprising:

at least one multimode waveguide or an array of monomode guides, having an input and an output, for exchanging and transforming the intensity distribution of said light beam such that said light beam comprises a single maxima at the input and N maxima at the output, wherein N is at least two, and said multimode waveguide or said monomode guides are integrated into the guidance structure, detection means for measuring the intensity distribution at N collinearly aligned measuring points located at the output of said multimode waveguide or said array of monomode guides, and analysis means for analyzing the intensity distribution, wherein said analysis means is connected to said detection means.

2. An integrated optics device according to claim 1, wherein said detection means is positioned in such a way as to be able to measure the intensity for at least N output points of said multimode waveguide or said array of monomode guides, called measuring points.

3. An integrated optics device according to claim 2, wherein said analysis means is able to calculate the intensities $I_n$ ($1 \leq n \leq N$) at N measuring points and to deduce therefrom a position error signal $S_p$ and/or a focusing error signal $S_F$.

4. An integrated optics device according to claim 3, such that:

if $N = 2$: $S_p$ is proportional to $I_2 - I_1$, if $N = 3$: $S_p$ is proportional to $I_3 = I_1$, and $S_F$ is proportional to $I_2 - (I_1 + I_3)$, if $N \geq 4$: $S_p$ is proportional to $\sum_{k=1}^{N/2} \alpha_k I_k - \sum_{k=\frac{N}{2}+1}^{N} \alpha_{N-k+1}{}^k$ if $N$ is even or to $\sum_{k=1}^{\frac{N-1}{2}} \alpha_k I_k - \sum_{k=\frac{N+3}{2}}^{N} \alpha_{N-k+1}{}^k$ if $N$ is uneven with $\alpha_k = 0$ or 1 for any $k$ and if $N = 4m$: $S_F$ is proportional to $\left( \sum_{k=1}^{m} I_k + \sum_{3m+1}^{N} I_k \right) - \sum_{k=m+1}^{3m} I_k$ ($m$ = integer $\geq 1$) or, if $N = 4m + 1$, $S_F$ is proportional to $\left( \sum_{k=1}^{m} I_k + \sum_{3m+2}^{N} I_k \right) - \sum_{m+1}^{3m+1} I_k$ or, if $N = 4m + 2$, $S_F$ is proportional to $\left( \sum_{k=1}^{m+1} I_k + \sum_{3m+2}^{N} I_k \right) - \left( \sum_{m+2}^{3m+1} I_k \right)$ or -continued $$\text{to} \left( \sum_{k=1}^{m} I_k + \sum_{3m+3}^{N} I_k \right) - \sum_{m+1}^{3m+2} I_k$$

or if $N = 4m + 3$, $S_F$ is proportional to $$\left( \sum_{k=1}^{m+1} I_k + \sum_{k=3m+3}^{N} I_k \right) - \left( \sum_{m+2}^{3m+2} I_k \right).$$

5. An integrated optical device according to claim 3, further comprising means for emitting a light beam, means for focusing said light beam onto an optical or magneto-optical disk, correcting means between the analysis means and optical means integrated into the guidance structure for focusing said light beam at the input of said multimode waveguide or said array of monomode guides, said connecting means maintaining the position and/or focusing of the beam on a given track of said optical or magneto-optical disk.

6. An integrated optical device according to claim 4, further comprising means for emitting a light beam, means for focusing said light beam onto an optical or magneto-optical disk, correcting means between the analysis means and optical means integrated into the guidance structure for focusing said light beam at the input of said multimode waveguide or said array of monomode guides, said connecting means maintaining the position and/or focusing of the beam on a given track of said optical or magneto-optical disk.

7. An integrated optics device according to claim 2, wherein said detection means comprises a plurality of photodetectors located at N measuring points.

8. An integrated optics device according to claim 7, wherein at least one photodetector is associated with each of said measuring points.

9. An integrated optics device according to claim 2, wherein said detection means incorporates microguides or optical fibres in a number N for connecting the N measuring points to said photodetectors.

10. An integrated optics device according to claim 9, wherein at least one photodetector is associated with each of said measuring points.

11. An integrated optics device according to claim 1, wherein said detection means incorporates a detector which is able to supply a continuous image of the intensity distribution at the guide output.

12. An integrated optics device according to claim 11, wherein said analysis means deduces from the continuous image the intensities $I_n$ ($1 \leq n \leq N$) at N measuring points, as well as a focusing error signal $S_F$ and/or a position error signal $S_p$.

13. An integrated optics device according to claim 12, such that:

if $N = 2$: $S_p$ is proportional to $I_2 - I_1$, if $N = 3$: $S_p$ is proportional to $I_3 = I_1$, and $S_F$ is proportional to $I_2 - (I_1 + I_3)$, if $N \geq 4$: $S_p$ is proportional to $\sum_{k=1}^{N/2} \alpha_k 1_k - \sum_{k=\frac{N}{2}+1}^{N} \alpha_{N-k+1} 1_k$ if N is even or to $\sum_{k=1}^{\frac{N-1}{2}} \alpha_k 1_k - \sum_{k=\frac{N+3}{2}}^{N} \alpha_{N-k+1} 1_k$ if N is uneven with $\alpha_k = 0$ or 1 for any $k$ and if $N = 4m$: $S_F$ is proportional to $\left( \sum_{k=1}^{m} I_k + \sum_{3m+1}^{N} I_k \right) - \sum_{k=m+1}^{3m} I_k$ ($m$ = integer $\geq 1$) or, if $N = 4m + 1$, $S_F$ is proportional to $$\left( \sum_{k=1}^{m} I_k + \sum_{3m+2}^{N} I_k \right) - \sum_{m+1}^{3m+1} I_k \text{ or,}$$

if $N = 4m + 2$, $S_F$ is proportional to $$\left( \sum_{k=1}^{m+1} I_k + \sum_{3m+2}^{N} I_k \right) - \left( \sum_{m+2}^{3m+1} I_k \right) \text{ or,}$$

$$\text{to} \left( \sum_{k=1}^{m} I_k + \sum_{3m+3}^{N} I_k \right) - \sum_{m+1}^{3m+2} I_k$$

if $N = 4m + 3$, $S_F$ is proportional to $$\left( \sum_{k=1}^{m+1} I_k + \sum_{k=3m+3}^{N} I_k \right) - \left( \sum_{m+2}^{3m+2} I_k \right).$$

14. An integrated optics device according to claim 12, further comprising means for emitting a light beam, means for focusing said light beam onto an optical or magneto-optical disk, correcting means between the analysis means and optical means integrated into the guidance structure for focusing said light beam at the input of said multimode waveguide or said array of monomode guides, said correcting means maintaining the position and/or focusing of the light beam on a given track of said optical or magneto-optical disk.

15. An integrated optical device according to claim 13, further comprising means for emitting a light beam, means for focusing said light beam onto an optical or magneto-optical disk, correcting means between the analysis means and optical means integrated into the guidance structure for focusing said light beam at the input of said multimode waveguide or said array of monomode guides, said connecting means maintaining the position and/or focusing of the beam on a given track of said optical or magneto-optical disk.

16. An integrated optics device according to claim 11, wherein a focusing error signal $S_F$ and/or a position error signal $S_p$ are obtainable by comparison with reference intensity distributions.

17. An integrated optics device according to claim 16, further comprising means for emitting a light beam, means for focusing said light beam onto an optical or magneto-optical disk, correcting means between the analysis means and optical means integrated into the guidance structure for focusing said light beam at the input of said multimode waveguide or said array of monomode guides, said connecting means maintaining the position and/or focusing of the beam on a given track of said optical or magneto-optical disk.

18. An integrated optics device according to claim 1, further comprising optical means integrated into the guidance structure for focusing the light beam at the input of the multimode waveguide or the array of monomode guides.

19. An integrated optics device according to claim 18, wherein said optical means enlarges the light beam.

20. An integrated optics device according to claim 1, further comprising optical means for enlarging the light beam.

* * * * *